(12) United States Patent
Vergara

(10) Patent No.: US 11,955,797 B1
(45) Date of Patent: Apr. 9, 2024

(54) METHODS AND SYSTEMS FOR MANAGING POWER DISTRIBUTION IN AN ELECTRICAL DISTRIBUTION NETWORK

(71) Applicant: Zola Electric Labs Inc., San Francisco, CA (US)

(72) Inventor: Claudio Vergara, Amsterdam (NL)

(73) Assignee: Zola Electric Labs Inc., San Francisco, CA (US)

( * ) Notice: Subject to any disclaimer, the term of this patent is extended or adjusted under 35 U.S.C. 154(b) by 0 days.

(21) Appl. No.: 18/169,829

(22) Filed: Feb. 15, 2023

(51) Int. Cl.
  *H02J 13/00* (2006.01)
  *G05B 19/042* (2006.01)
  *H02J 3/00* (2006.01)
  *H02J 3/38* (2006.01)

(52) U.S. Cl.
  CPC ...... *H02J 13/00002* (2020.01); *G05B 19/042* (2013.01); *H02J 3/0012* (2020.01); *H02J 3/381* (2013.01); *G05B 2219/2639* (2013.01)

(58) Field of Classification Search
  CPC .... H02J 13/00002; H02J 3/0012; H02J 3/381; G05B 19/042; G05B 2219/2639
  See application file for complete search history.

(56) References Cited

U.S. PATENT DOCUMENTS

| | | | |
|---|---|---|---|
| 7,920,942 B2 | 4/2011 | Lasseter et al. | |
| 8,848,406 B2 | 9/2014 | Ohshima et al. | |
| 9,647,458 B2 | 5/2017 | Arya et al. | |
| 9,893,640 B2 | 2/2018 | Steinberg | |
| 10,714,938 B2 | 7/2020 | Wells et al. | |
| 2007/0140295 A1* | 6/2007 | Akaboshi | H04L 43/00 370/468 |
| 2019/0089722 A1* | 3/2019 | Ciocarlie | H04L 63/1408 |
| 2019/0157982 A1* | 5/2019 | Brueckner | H02M 1/36 |
| 2022/0216698 A1* | 7/2022 | Thompson | H02J 3/40 |
| 2023/0019768 A1* | 1/2023 | Fletcher | G05B 19/042 |

FOREIGN PATENT DOCUMENTS

EP   3179597 B1   1/2021

* cited by examiner

*Primary Examiner* — Charles Cai
(74) *Attorney, Agent, or Firm* — Kanika Radhakrishnan; Evergreen Valley Law Group

(57) ABSTRACT

Various embodiments provide methods and systems for monitoring and controlling electrical components of an electrical distribution network. In an embodiment, a method, performed by an automated controller, includes receiving values corresponding to electrical parameter(s) associated with multiple connection points in the electrical distribution network, the values being acquired via electrical sensor(s). The method also includes transmitting the values to a local area supervisory controller, upon receiving a measurements-related request. The method further includes receiving a control message from the local area supervisory controller, the control message including predefined conditions and information indicating the automated controller to wait for the predefined conditions to be met between two connection points having a connection point to which a distributed energy resource (DER) is connected. The method further includes controlling an operation of contactor(s) positioned between the two connection points based at least on the predefined conditions.

19 Claims, 9 Drawing Sheets

METHODS AND SYSTEMS FOR MANAGING POWER DISTRIBUTION IN AN ELECTRICAL DISTRIBUTION NETWORK

TECHNICAL FIELD

The present disclosure relates generally to distributed electrical networks and, more particularly to, methods and systems for managing power distribution in an electrical distribution network.

BACKGROUND

Alternating current (AC) voltage is a type of voltage generated by the vast majority of power generation systems and is used by most power distribution systems for distributing power to consumer loads. Most of the power generated by the power generation systems is three-phase power. The three-phase power is distributed to consumer loads through a large network of transmission lines, which is commonly known as an electrical grid.

Most of the consumer loads served by the electric grid are single-phase. However, consumer loads do not receive power when the electric grid is at fault. To keep the continuity of power during the absence of power from the electric grid, microgrids were installed in which a group of consumer loads is connected by a small electrical network that is energized by local distributed energy resources (DERs). The consumer loads may be three-phase loads as well. Most of the DERs generate single-phase power. If the DERs connected to the small electric network produce more power than required by the consumer loads in the network, the excess power is stored in batteries installed with the DERs. However, the excess power from the DERs can also be provided to the electric grid or any other electric power system that requires power. To provide the single-phase power from the DERs to the three-phase electric grid or to three-phase loads of the consumers, there is a need to establish a connection between DERs and electric power systems that requires efficient conversion of single-phase power from multiple DERs to three-phase power.

The connection between multiple electrical systems can be formed upon meeting certain interconnectivity standards laid by power safety organizations across the world. The connection requires a lot of electrical components that can stabilize the new network formed by the interconnection of the multiple electrical systems. The electrical components have to be monitored from time to time to check the stability and operation of the interconnected electrical systems.

Therefore, there is a need for a system to manage power distribution in an electrical distribution network.

SUMMARY

Various embodiments of the present disclosure provide methods and systems for managing power distribution in an electrical distribution network.

In an embodiment, a method is disclosed. The method includes receiving values corresponding to one or more electrical parameters associated with a plurality of connection points in an electrical distribution network, the values being acquired via one or more electrical sensors located at the plurality of connection points. The method further includes transmitting the values to a local area supervisory controller, upon receiving a measurements-related request from the local area supervisory controller. The method also includes receiving a control message from the local area supervisory controller, the control message including predefined conditions and information indicating the automated controller to wait for the predefined conditions to be met between two connection points of the plurality of connections points, the two connection points including a connection point to which a distributed energy resource (DER) is connected. Further, the method includes controlling, by the automated controller, an operation of one or more contactors positioned between the two connection points, based at least on the predefined conditions.

In another embodiment, a method is disclosed. The method includes receiving values corresponding to one or more electrical parameters associated with a plurality of connection points in an electrical distribution network, from an automated controller. The method also includes determining predefined conditions to be met between two connection points of the plurality of connection points based at least on the values and one or more desired applications. The two connection points include a connection point connected to a Distributed Energy Resource (DER). The method further includes transmitting a control message to the automated controller, the control message including the predefined conditions, and information indicating the automated controller to wait for the predefined conditions to be met between the two connection points. Further, the method also includes calculating set points associated with one or more power supply parameters to be regulated at one or more inverters of the DER in the electrical distribution network, based at least on the predefined conditions. Furthermore, the method includes transmitting the set points to the one or more inverters, for regulating the one or more power supply parameters associated with the one or more inverters, to meet the predefined conditions between the two connection points.

In yet another embodiment, an automated controller is disclosed. The automated controller includes a memory configured to store instructions, a communication interface, and a processor configured to execute the instructions stored in the memory and thereby cause the automated controller to perform one or more operations as described below. The automated controller is configured to receive values corresponding to one or more electrical parameters associated with a plurality of connection points in an electrical distribution network. The values are acquired via one or more electrical sensors located at the plurality of connection points. The automated controller is further caused to transmit the values to a local area supervisory controller, upon receiving a measurements-related request from the local area supervisory controller. Further, the automated controller is caused to receive a control message from the local area supervisory controller. The control message includes predefined conditions and information indicating the automated controller to wait for the predefined conditions to be met between two connection points of the plurality of connection points. The two connection points include a connection point to which a distributed energy resource (DER) is connected. The automated controller is configured to control an operation of one or more contactors positioned between the two connection points, based at least on the predefined conditions.

Further, in yet another embodiment, a local area supervisory controller is disclosed. The local area supervisory controller includes a memory configured to store instructions, a communication interface, and a processor configured to execute the instructions stored in the memory and thereby cause the local area supervisory controller to perform one or more operations as described below. The local area supervisory controller is configured to receive values corresponding to one or more electrical parameters associated with a plurality of connection points in an electrical distribution network, from an automated controller. The local area supervisory controller is further caused to determine predefined conditions to be met between two connection points of the plurality of connection points based at least on the values and one or more desired applications. The two connection points include a connection point connected to a Distributed Energy Resource (DER). Further, the local area supervisory controller is caused to transmit a control message to the automated controller. The control message includes the predefined conditions and information indicating the automated controller to wait for the predefined conditions to be met. The local area supervisory controller is configured to calculate set points associated with one or more power supply parameters to be regulated at one or more inverters of the DER in the electrical distribution network, based at least on the predefined conditions. The local area supervisory controller is further configured to transmit the set points to the one or more inverters, for regulating the one or more power supply parameters associated with the one or more inverters, to meet the predefined conditions between the two connection points.

Furthermore, in yet another embodiment, a distributed electrical system is disclosed. The distributed electrical system includes at least one automated controller. The distributed electrical system also includes at least one local area supervisory controller operatively coupled with the at least one automated controller. The at least one automated controller is configured to receive values corresponding to one or more electrical parameters associated with a plurality of connection points in an electrical distribution network. The values are acquired via one or more electrical sensors located at the plurality of connection points. The at least one automated controller is further caused to transmit the values to the at least one local area supervisory controller, upon receiving a measurements-related request from the at least one local area supervisory controller. Further, the at least one automated controller is caused to receive a control message from the at least one local area supervisory controller. The control message includes predefined conditions and information indicating the at least one automated controller to wait for the predefined conditions to be met between two connection points of the plurality of connection points. The two connection points include a connection point to which a distributed energy resource (DER) is connected. The at least one automated controller is further caused to control an operation of one or more contactors positioned between the two connection points, based at least on the predefined conditions. The at least one local area supervisory controller is configured to receive the values corresponding to the one or more electrical parameters associated with the plurality of connection points in the electrical distribution network, from the at least one automated controller. The at least one local area supervisory controller is further caused to determine the predefined conditions to be met between the two connection points based at least on the values and one or more desired applications. Further, the at least one local area supervisory controller is configured to transmit the control message to the at least one automated controller. The control message includes the predefined conditions and the information indicating the at least one automated controller to wait for the predefined conditions to be met, prior to controlling the operation of the one or more contactors. Furthermore, the at least one local area supervisory controller is caused to calculate set points associated with one or more power supply parameters to be regulated at one or more inverters of the DER in the electrical distribution network, based at least on the predefined conditions. The at least one local area supervisory controller is configured to transmit the set points to the one or more inverters, for regulating the one or more power supply parameters associated with the one or more inverters, to meet the predefined conditions between the two connection points.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1:
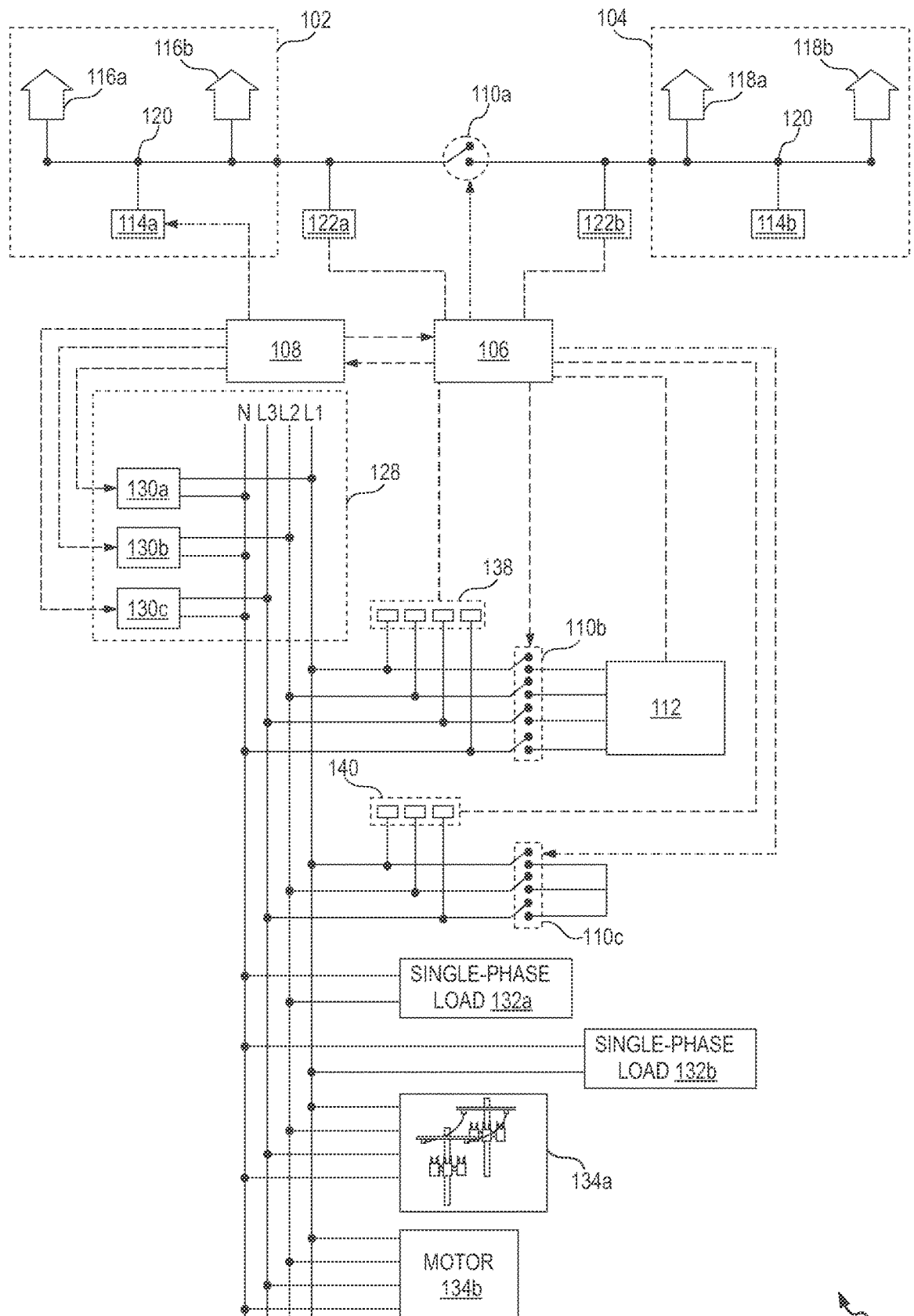
FIG. 1 is an illustration of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The terms "consumer", "customer", "user", "load", and "houses" may have been used interchangeably throughout the description, and they refer to any person, entity, or group that uses the power supply provided by the power supply companies.

The terms "electrical power supply system", "electric power systems", "electrical distribution network", "distribution network", "power distribution network", "grid", "microgrid", and "power grid", may have been used interchangeably throughout the description, and they refer to an electrical network of one or more components deployed to supply, transfer and use electric power. The majority of the electrical power supply system(s) use three-phase alternating current (AC) power for large-scale power transmission and distribution. Further, most of the customer locations (e.g., homes) are generally provided with a single-phase power supply, and the three-phase power supply is typically used in commercial/industrial situations and large homes.

Overview

Various embodiments of the present disclosure provide methods and systems for managing power distribution in an electrical distribution network. In one embodiment, a system is proposed that facilitates a connection of multiple electric power systems and distributed energy resources (DERs), and a transformation of single-phase power to three-phase power. The electric power systems can be a microgrid, a public grid, and any other power distribution network. A DER is a small-scale power supply located close to a local load, where the DER can be diesel or natural gas generators, microturbines, solar arrays, small wind farms, battery energy storage systems, and the like. The system includes an automated controller and a local area supervisory controller. The automated controller controls one or more electrical components in the electric power systems, in addition, the automated controller reports to the local area supervisory controller that further manages the electric power systems and the DERs.

To efficiently utilize power generated by the multiple electric power systems, the electric power systems can be interconnected through electric switches. The electric switches act as interfaces that connect or disconnect two or more electric power systems to make the power flow between the connected electric power systems. In order to connect two electric power systems, the two electric power systems have to meet certain conditions before the electric switches are closed for the proper functioning of the combined electric power system. These conditions are referred to as synchronization conditions. The synchronization conditions vary based on the electric power systems that are being connected. In order to check whether the synchronization conditions are met at the electric switches, the automated controller is provided that monitors the power flow at the electric switches. The automated controller receives values corresponding to electrical parameters at the electric switches from sensors placed at the ends of the electric switches. The values are communicated to the local area supervisory controller to determine set points for the DERs present in any of the two electric power systems that need to be connected. The automated controller waits for the synchronization conditions to be met and instructs the electric switches to close, thereby connecting the two electric power systems. The synchronization conditions for connecting two single-phase electric power systems is that frequency and amplitude of alternating current (AC) voltage of the two electric power systems have to be approximately the same. The DERs regulate the AC voltage based on the set points, thereby meeting the synchronization conditions.

Upon connecting the two electric power systems, the power flow across the interfaces has to be monitored for the proper functioning of the connected electric power systems. Further, the combined electric power system formed by connecting two or more electric power systems can become unstable and therefore the interfaces are monitored by the automated controller. The automated controller receives values of the voltage, frequency, and phase at the electric switches and communicates the values to the local area supervisory controller in a timely manner.

In addition to the facilitation of connection or disconnection of the two electric power systems, the automated controller and the local area supervisory controller also facilitate the generation of three-phase power from multiple single-phase DERs to provide the three-phase power to a three-phase electric power system. The voltage waveforms in three-phase systems are spaced by 120 degrees, which results in zero current flowing through neutral when power drawn from the three phases is the same. Maintaining 120 degrees phase separation is important because electrical machines rely on the phase separation to maintain constant torque. In some of the electric power systems, DERs used are mostly single phase and to export to a three-phase load or a large electric power system such as a public grid, conversion of the single-phase power into three-phase is required. However, if several DERs are connected between a line and a neutral of a three-phase feeder, the power system formed will behave like three independent single-phase networks which will not follow the 120 degrees of phase separation. In order to generate a balanced three-phase system from individual DERs, a balancing transformer in combination with the automated controller is provided. The three-phase feeder is connected to the balancing transformer through electrical switches. The automated controller receives values corresponding to individual lines' electrical parameters such as voltages, frequencies, and phases, and sends the values to the local area supervisory controller. The local area supervisory controller determines setpoints for the DERs in the lines of the three-phase feeder to regulate the electrical parameters to form an approximately balanced and unstable arrangement of voltage phasors. Once this is achieved, the electrical switches connected between the three-phase feeder and the balancing transformer, close in order for the balancing transformer to produce a stable balanced operation point.

Although process steps, method steps, or the like in the disclosure may be described in sequential order, such processes and methods may be configured to work in alternate orders. In other words, any sequence or order of steps that may be described in this patent application does not, in and of itself, indicate a requirement that the steps need to be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, and does not imply that the illustrated process or any of its steps are necessary to one or more of the invention (s), and does not imply that the illustrated process is preferred.

Various embodiments of methods and systems for managing power distribution in the electrical distribution network are further described with reference to FIGS. 1-9.

FIG. 1 is an example representation of an environment 100 related to at least some example embodiments of the present disclosure. Although the environment 100 is presented in one arrangement, other embodiments may include the parts of the environment 100 (or other parts) arranged otherwise depending on whether there is a connection of multiple electric power systems and distributed energy resources (DERs) and/or transformation of single-phase power to three-phase power. The electric power systems may be a microgrid, a public grid, or any other power distribution network.

The environment 100 as depicted in FIG. 1 includes a microgrid 102, a microgrid 104, an automated controller 106, a local area supervisory controller 108, contactors 110a, 110b, and 110c, and a balancing transformer 112. Each microgrid includes a DER 114a and 114b acting as local sources of supply for loads at consumers 116a, 116b, 118a, and 118b, where the supply from the DERs 114a and 114b is distributed to the loads through distribution poles 120 in each microgrid. The automated controller 106 controls one or more electrical components such as, but not limited to, the contactors 110a-110c in an electric power system. In addition, the automated controller 106 reports to the local area supervisory controller 108 that further manages the DERs 114a and 114b and the electric power systems such as, but not limited to, the microgrids 102 and 104. For example, the DERs 114a and 114b may be solar panels, photovoltaic (PV) panels, wind sources, biogas sources, low-power hydroelectricity, battery energy storage systems, and the like.

The contactor 110a positioned between the two microgrids 102 and 104 is acting as an interface that connects or disconnects the two microgrids to make power flow between the connected power systems (the two microgrids 102 and 104). The interconnection may be needed for efficiently utilizing power generated in the multiple electric power systems (e.g., the microgrids 102 and 104). In order to connect the two microgrids 102 and 104, the two microgrids 102 and 104 have to meet predefined conditions before the contactor 110a is closed for the proper functioning of the combined electric power system (the microgrids 102 and 104 that are connected with each other). The predefined conditions correspond to synchronization conditions or connection conditions based on one or more desired applications. For example, the one or more desired applications may include an application of connecting two connection points including two standalone single phase electric power systems (e.g., microgrids 102 and 104), an application of connecting two standalone three-phase electric power systems, an application of connecting two connection points including an electrical network having one or more DERs being connected between a line and a neutral on a three-phase feeder and a three-phase balancing transformer. The predefined conditions may include the synchronization conditions when the one or more desired applications may include the application of connecting the two standalone single phase electric power systems or the application of connecting the two three-phase electric power systems. Further, the predefined conditions may include the connection conditions when the one or more desired applications may include the application of connecting the two connection points including the electrical network having the one or more DERs being connected between a line and a neutral on a three-phase feeder and a three-phase balancing transformer. Thus, the predefined conditions vary based on the electric power systems that are being connected.

Thus, in the case of connecting or disconnecting two microgrids (102 and 104), the predefined conditions may be the synchronization conditions. Further, in order to check whether the synchronization conditions are met at the contactor 110a, the automated controller106 is provided that monitors the power flow at the contactor 110a. The automated controller 106 receives values corresponding to electrical parameters at the contactor 110a from electrical sensors 122a and 122b placed at the ends of the contactor 110a. Thus, the environment 100 further depicts the electrical sensors 122a, and 122b positioned at the ends of the contactor 110a. The values are communicated to the local area supervisory controller 108 to determine set points for the DERs 114a and 114b present in any of the two microgrids 102 and 104 that need to be connected. The automated controller 106 waits for the synchronization conditions to be met and instructs the contactor 110a to close, thereby connecting the two microgrids 102 and 104. The synchronization conditions for connecting two single-phase electric power systems is that frequency and amplitude of alternating current (AC) voltage of the two single-phase electric power systems have to be approximately the same. The DERs 114a and 114b regulate the AC voltage based on the set points, thereby meeting the synchronization conditions.

Upon connecting the two microgrids 102 and 104, the power flow across the interfaces (such as contactor 110a) has to be monitored for the proper functioning of the connected electric power systems (microgrids 102 and 104). Further, the combined electric power system formed by connecting two microgrids 102 and 104 can become unstable and therefore the interfaces are monitored by the automated controller 106. The automated controller 106 receives values of the voltage, frequency, and phase at the contactor 110a and communicates the values to the local area supervisory controller 108 upon request or automatically.

The DERs 114a and 114b generally include single-phase generators, batteries, power conversion units (PCUs) or inverters, and the like. When the two microgrids 102 and 104 are connected, there is an exchange of active and reactive power between the inverters of the DERs 114a and 114b which causes an error such as area control error (ACE) to occur between the DERs 114a and 114b. In order to reduce the error, when the inverters are droop-controlled inverters, a droop control technique can be used for primarily controlling the error. The local area supervisory controller 108 manages to maintain a linear relationship between the active and reactive power exchanged with an electrical network (such as the microgrid 102) based on the voltage and frequency received via the automated controller 106. The relationship may be expressed as:

$$\begin{bmatrix} I_a \\ I_r \end{bmatrix} = Y \begin{bmatrix} F_0 + F_b - F \\ V_0 + V_b - V \end{bmatrix} \quad (1)$$

Where $I_a$ and $I_r$ are the active and reactive components of the current, and Y is a 2×2 matrix of constant coefficients, F and V are the measured frequency and voltage, $F_0$, $V_0$ are the nominal values of frequency and voltage, respectively, and $F_b$, $V_b$ are known as set points.

The error is further reduced by utilizing the set points calculated by the local area supervisory controller 108. The error may be expressed as:

$$ACE = \begin{bmatrix} F - F_0 \\ V - V_0 \end{bmatrix} + G \cdot (I_G^{set} - I_G) \quad (2)$$

Here, G is the inverse matrix of Y, and $I_G^{set} - I_G$ is the error between the current exchange setpoint ($I_a^{set}$, $I_r^{set}$) of the DERs 114a and 114b and the measured power flow.

In addition to facilitation of connection or disconnection of the two microgrids 102 and 104, the automated controller 106 and the local area supervisory controller 108 also facilitate the generation of three-phase power from multiple single-phase DERs to provide the three-phase power to a three-phase electric power system. Thus, the environment 100 also depicts an electrical network 128 of DERs 130a, 130b, and 130c connected between lines L1 and neutral (N), L2 and N, and L3 and N respectively. Generally, voltage waveforms in three-phase systems are spaced by 120 degrees, which results in zero current flowing through the neutral when the power drawn from the three phases is the same. Maintaining 120 degrees phase separation is important because electrical machines rely on phase separation to maintain constant torque. In some of the electric power systems, DERs used are mostly single phase and to export to a three-phase load such as a three-phase electric motor, or a large electric power system such as a public grid which is also a three-phase load, conversion of the single-phase power into three-phase is required. However, if several DERs are connected between a line and neutral of a three-phase feeder (as depicted in FIG. 1 as the electrical network 128), the power system or the electrical network 128 formed will behave like three independent single-phase networks which will not follow the 120 degrees phase separation. In order to generate a balanced three-phase system from individual DERs 130a-130c, the balancing transformer 112 in combination with the automated controller 106 is provided. The electrical network 128 is connected to the balancing transformer 112 through the contactors 110b to provide the three-phase power to a three-phase electric power system. The three-phase power is generated by balancing the three phases in the electrical network 128 generated by each of the DERs 130a-130c.

The environment 100 also depicts single-phase loads such as single-phase loads 132a and 132b and three-phase loads such as a public grid 134a and a three-phase motor 134b that are connected to the electrical network 128 in a way as shown in FIG. 1. The contactors 110c are provided on the electrical network 128. In an embodiment, when the contactors 110c are closed, the contactors 110b always remain open. In such an embodiment, the DERs 130a-130c are effectively connected to the same phase. Further, under this condition, the three-phase loads cannot be served, and the three-phase loads need to count with automatic protections to disconnect them from the electrical network 128. On the other hand, the single-phase loads 132a and 132b can benefit from the full power available from all the DERs 130a-130c. In an alternative embodiment, when the contactors 110b are closed and the contactors 110c are open, then the DERs 130a-130c power independent phases of the electrical network 128. In such an embodiment, the single-phase loads 132a and 132b continue to be powered, albeit in different phases. Further, the three-phase loads receive the three-phase power from the balanced three-phase power system. Moreover, the contactors 110b are closed upon meeting the synchronization connection conditions. In such a scenario, the connection conditions for three-phase electric power systems is that a sequence of three phases of the three-phase supply and the public grid has to be the same.

The automated controller 106 receives values corresponding to individual lines' electrical parameters such as voltages, frequencies, and phases, and sends the values to the local area supervisory controller 108. The values are received from electrical sensors positioned at the ends of the contactors 110b and 110c. Thus, the environment 100 further depicts electrical sensors 138 positioned at the end of the contactors 110b, and electrical sensors 140 positioned at the ends of the contactors 110c.

The local area supervisory controller 108 determines setpoints for the DERs 130a-130c in the lines of the electrical network 128 to regulate the electrical parameters to form a balanced three-phase supply. The balanced three-phase supply is provided to the three-phase loads when the contactors 110c are open and 110b are closed.

Moreover, only one automated controller 106 and only one local area supervisory controller 108 are shown in FIG. 1 for ease of representation, and there may be more than one such automated controller and local area supervisory controller in the environment 100. Also, only one balancing transformer 112 is shown for ease of representation, however, there may be more than one such balancing transformer in environment 100.

Figure 2:
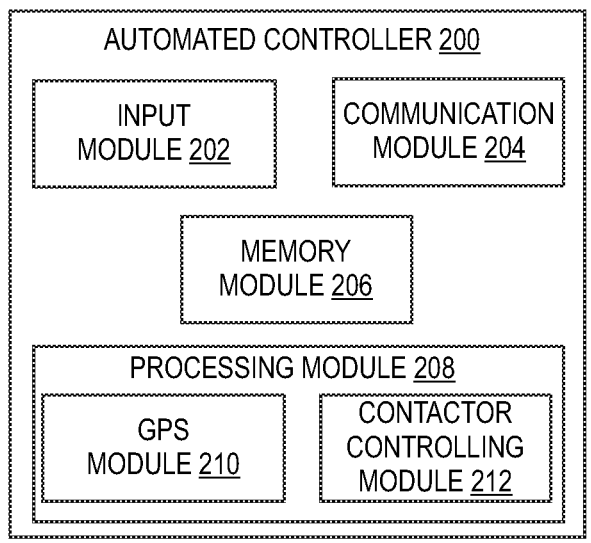
FIG. 2 is a block diagram representation of an automated controller, in accordance with an embodiment of the invention.

FIG. 2 is a block diagram representation of an automated controller 200, in accordance with an embodiment of the invention. The automated controller 200 may be similar to the automated controller 106 as described in FIG. 1. In one embodiment, the automated controller 200 may be included in a synchronizing interface (such as contactors 110a-110c). Thus, the synchronizing interface may enable two Alternating Current (AC) circuits (single-phase or three-phase) to connect with each other upon meeting the synchronization conditions between the two AC circuits. In another embodiment, the automated controller 200 may be included in a sensing, control, and communications interface of a balancing transformer (such as the balancing transformer 112). Thus, the sensing, control, and communications interface may enable synchronizing the one or more electrical parameters at the electrical network 128 of the DERs 130a-130c in accordance with a balanced three-phase network by connecting the electrical network 128 to the balancing transformer 112 such as a three-phase balancing transformer upon meeting the connection conditions.

The automated controller 200 includes an input module 202, a communication module 204, a memory module 206, and a processing module 208. The processing module 208 further includes a Global Positioning System (GPS) module 210, and a contactor controlling module 212. It is noted that, although the automated controller 200 is depicted to include the communication module 204, the memory module 206, and the processing module 208, in some embodiments, the automated controller 200 may include more or fewer components than those depicted herein. The various components of the automated controller 200 may be implemented using hardware, software, firmware, or any combination thereof.

In an embodiment, the input module 202 is configured to receive instructions from an operator of the automated controller 200 to control an operation of the processing module 208. Further, the communication module 204 is configured to receive the values corresponding to the one or more electrical parameters associated with the plurality of connection points in the electrical distribution network. The values are acquired via the one or more electrical sensors (such as 122a, 122b, 138, and 140 in FIG. 1) located at the plurality of connection points. In an embodiment, the one or more electrical parameters may include at least one of voltage, current, phase, frequency, and power flow. The one or more electrical sensors 122a, 122b, 138, and 140 may include one or more AC sensors. In one embodiment, the one or more electrical sensors 122a, 122b, 138, and 140 may be located at the automated controller 200. In such embodiment, the one or more electrical sensors 122a, 122b, 138, and 140 may be directly connected to low-voltage AC circuits, AC transformers, and the like. Further, in an example, the automated controller 200 may further include one or more opto-isolated terminals for acquiring states of one or more external devices (such as the contactors 110a-110c). Thus, the communication module 204 may also receive digital inputs such as the states of the contactors 110a-110c via the one or more opto-isolated terminals of the automated controller 200.

The memory module 206 is configured to store the values received by the communication module 204. The memory module 206 may be embodied as one or more non-volatile memory devices, one or more volatile memory devices, and/or a combination of one or more volatile memory devices and non-volatile memory devices. For example, the memory module 206 may be embodied as semiconductor memories, such as flash memory, mask ROM, PROM (programmable ROM), EPROM (erasable PROM), RAM (random access memory), etc., and the like.

Further, the communication module 204 is configured to transmit the values to the local area supervisory controller, upon receiving a measurements-related request from the local area supervisory controller. The communication module 204 is further configured to receive a control message from the local area supervisory controller. The control message includes the predefined conditions and information indicating the automated controller 200 to wait for the predefined conditions to be met between the two connection points of the plurality of connections points, the two connection points including a connection point to which a distributed energy resource (DER) is connected.

The communication module 204 is configured to facilitate communication between the automated controller 200 and one or more components in the environment 100 using a wired network, a wireless network, or a combination of wired and wireless networks. Some non-limiting examples of the wired networks may include the Ethernet, the Local Area Network (LAN), a fiber-optic network, and the like. Some non-limiting examples of the wireless networks may include the Wireless LAN (WLAN), cellular networks, Bluetooth or ZigBee networks, and the like.

Further, in an example, the processing module 208 is configured to process the values received from the one or more electrical sensors 122a, 122b, 138, and 140 for detecting conditions including detecting the fault in the electrical distribution network and checking whether the safety regulations are met or not. The processing module 208 processes the values using adaptive algorithms based on historical conditions and simulation models. The algorithms are adaptive in the sense that they will classify the values as faults depending on set points of the automated controller 200. For example, the amount of current acquired by a fault in the middle of a sunny day will look very different from the same fault at night. Therefore, the local area supervisory controller periodically updates the automated controller 200 with classification parameters given the observed conditions and the periodic simulation of possible fault events.

The GPS module 210 is configured to log received data with accurate time stamps determined based on a location of the automated controller 200. In one embodiment, the received data may correspond to the values received by the communication module 204. In scenarios when dealing with fast perturbations in a network, correcting the time stamps used in data logging is valuable for troubleshooting and for automatic protection adjustment to count with measurements taken at different places as it can be compared in a common time reference frame. While some level of synchronization can be achieved through digital communication between the microprocessors (wired or wireless) differences in the oscillators used to keep the time between updates and the signal propagation time usually result in variations in the order of milliseconds.

For example, the time drift of available embedded real-time clocks is not compatible with electric power system applications, and hence requires precise knowledge of relative time between measurements taken at distant places. Therefore, clocks associated with the automated controller 200 and the local area supervisory controller need to be periodically synchronized to a common reference. The GPS module 210 may include a receiver and an antenna (e.g., Global Navigation Satellite System (GNSS) module) that can demodulate signals coming from satellites in a global positioning network. Such satellites count with very precise clocks which are synchronized to the Universal Time Coordinated (UTC) time. The GNSS module receives a pulse from the GPS network every second, followed by a time stamp with the UTC time corresponding to the rising edge of the pulse. Further, the GPS module 210 is configured to enable the automated controller 200 to adjust an internal clock of the automated controller 200 to match with the information received through the GNSS module. Thus, a maximum discrepancy between time stamps and one or more automated controllers is a real-time clock (RTC) drift over one second, which is in order of microseconds and compatible with one or more desired applications.

In an exemplary embodiment, the automated controller 200 may be configured to perform measurement processes. The measurement processes include storing instantaneous calculations associated with the plurality of connection points such that, the instantaneous calculations are made instantly available to a local area supervisory controller (the local area supervisory controller 108 as shown in FIG. 1). The measurement processes further include storing historical calculations associated to the plurality of connection points such that, the historical calculations are made available for the local area supervisory controller at a later time for a specified time interval. Further, the measurement processes also include storing event-driven data associated with the plurality of connection points such that, the event-driven data is retrievable by the local area supervisory controller.

The contactor controlling module 212 is configured to control an operation of one or more contactors (e.g., the contactors 110a-110c as shown in FIG. 1) positioned between the two connection points based at least on the predefined conditions.

In one embodiment, the operation of the one or more contactors may include a closure of the one or more contactors when one of an external command requesting to close the one or more contactors is received and the predefined conditions are met between the two connection points. Further, the closing of the one or more contactors may include setting up a connection between the two connection points in the electrical distribution network via an interface, the interface including the automated controller 200 and the one or more contactors. In one scenario, the interface may be the synchronizing interface.

In another embodiment, the operation of the one or more contactors may include opening the one or more contactors when one of the attempts to meet the predefined conditions between the two connection points is failed, a reboot command is received, a time in a connecting state exceeds a timeout parameter, a fault is detected in the electrical distribution network, an operator needs to perform maintenance and inspection operations, and safety regulations are not met.

For example, under abnormal conditions, it becomes necessary to open the one or more contactors to avoid any kind of damage to the electrical distribution network. Also, when the operator needs to perform the maintenance and inspection operations, the one or more contactors may have to be opened. Under such circumstances, the local area supervisory controller sends instructions to the automated controller 200. The communication module 204 receives the instructions and the contactor controlling module 212 opens the one or more contactors. Alternatively, the operator can directly control the opening of the one or more contactors via a local user input interface such as a push button, a keypad, or the like.

In one embodiment, the processing module 208 may be embodied as a multi-core processor, a single core processor, or a combination of one or more multi-core processors and one or more single core processors. For example, the processing module 208 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a graphic processing unit (GPU), a field programmable gate array (FPGA), a microcontroller unit (MCU), a hardware accelerator, a special-purpose computer chip, or the like. In one embodiment, the memory module 206 is capable of storing machine-executable instructions. Further, the processing module 208 is capable of executing the instructions. In an embodiment, the processing module 208 may be configured to execute hard-coded functionality. In an embodiment, the processing module 208 is embodied as an executor of software instructions, wherein the instructions may specifically configure the processing module 208 to perform the algorithms and/or operations described herein when the instructions are executed.

Figure 3:
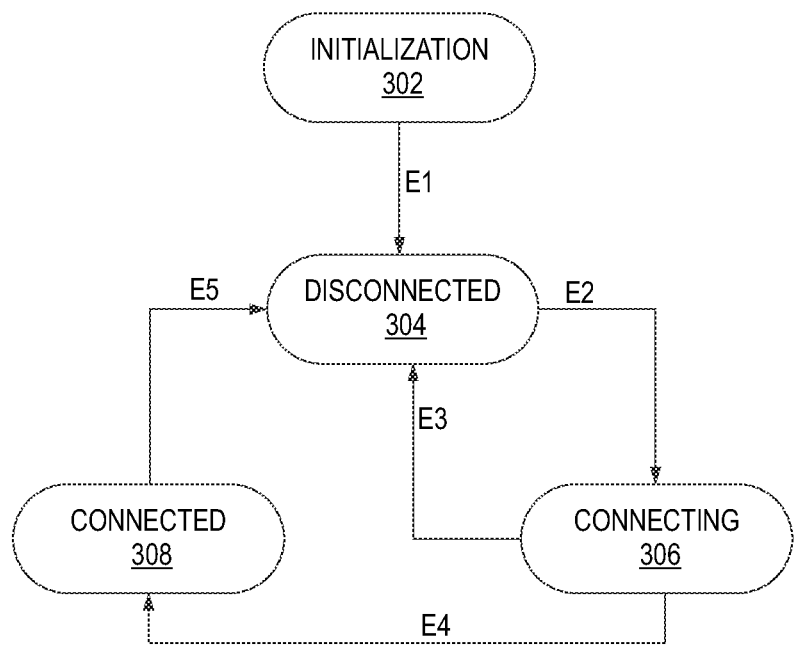
FIG. 3 is a schematic representation of a state machine of an automated controller in a synchronizing interface application, in accordance with an embodiment of the invention.

FIG. 3 is a schematic representation of a state machine 300 of the automated controller 200 in a synchronizing interface application, in accordance with an embodiment of the invention. As depicted in FIG. 3, in an example, the states of the one or more contactors (the contactors 110a-110c as shown in FIG. 1) as received by the automated controller 200 may include initialization 302, disconnected 304, connecting 306, and connected 308. Further, FIG. 3 shows a transition between the states via edges E1, E2, E3, E4, and E5. Furthermore, the edges that cause the transition between the states may be triggered under predefined conditions. In one example, the predefined conditions may include triggering of the edge E1 may occur always when a reboot command is received, and a power cycle is executed in absence of initialization errors. Further, triggering of the edge E2 may occur after receiving an external command requesting to close the one or more contactors. Triggering of the edge E3 may occur when the time in the connecting state exceeds a timeout parameter. Moreover, triggering of the edge E4 may occur when the synchronization conditions are met. Lastly, triggering of the edge E5 may occur when the synchronization conditions fail to meet, a fault may be detected in the electrical distribution network, an operator needs to perform maintenance and inspection operations, and safety regulations are not met.

Figure 4:
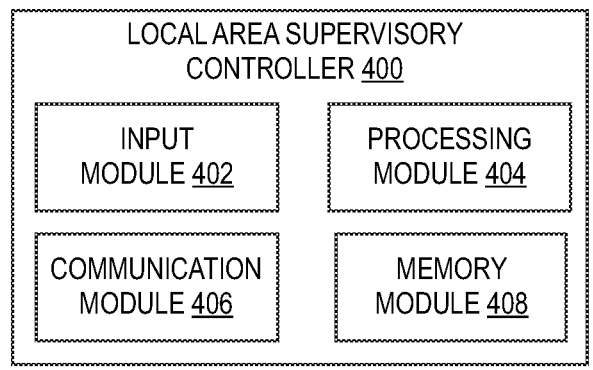
FIG. 4 is a block diagram representation of a local area supervisory controller, in accordance with an embodiment of the invention.

FIG. 4 is a block diagram representation of a local area supervisory controller 400, in accordance with an embodiment of the invention. The local area supervisory controller 400 may be similar to the local area supervisory controller 108 as described in FIG. 1. In an example, the local area supervisory controller 400 is depicted to include an input module 402, a processing module 404, a communication module 406, and a memory module 408. It is noted that, although the local area supervisory controller 400 is depicted to include the input module 402, the processing module 404, the communication module 406, and the memory module 408, in some embodiments, the local area supervisory controller 400 may include more or fewer components than those depicted herein. The various components of the local area supervisory controller 400 may be implemented using hardware, software, firmware, or any combination thereof.

In an example, the input module 402 is configured to receive instructions from the operator of the local area supervisory controller 400 to control an operation of the processing module 404. In an embodiment, the communication module 406 is configured to receive the values corresponding to the one or more electrical parameters associated with the plurality of connection points in the electrical distribution network, from an automated controller (such as the automated controller 200).

The processing module 404 is configured to determine the predefined conditions to be met between the two connection points of the plurality of connection points based on the values and the one or more desired applications. The predefined conditions may include the synchronization conditions or the connection conditions. Further, for example, the synchronization conditions can be different for an interconnection of two single-phase electric power systems when compared to synchronization conditions for an interconnection of two three-phase electric power systems.

In one embodiment, the synchronization conditions may include frequencies, voltage magnitudes between the two connection points being the same, and voltage phase angle difference between the two connection points being small with a connection point at a higher frequency leading, when the one or more desired applications correspond to connecting the two connection points including two standalone single-phase electric power systems. The synchronization conditions may further include each of the two connection points to have the same sequence for three-phases, when the one or more desired applications may correspond to connecting the two connection points including two three-phase electric power systems.

Similarly, the connection conditions may include at least one of frequency of three-phases being approximately the same, voltage amplitude of each of the three-phases being within an absolute and a relative range, and a voltage phase angle difference from a perfectly balanced configuration being small, when the one or more desired applications may include connecting the two connection points including an electrical network (e.g., the electrical network 128 as shown in FIG. 1) having one or more DERs (e.g., DERs 130a-130c) being connected between a line and a neutral on a three-phase feeder and a three-phase balancing transformer (e.g., the balancing transformer 112 as shown in FIG. 1).

The processing module 404 is further configured to calculate set points associated with one or more power supply parameters to be regulated at one or more inverters of the DER (e.g., DERs 114a, 114b, and 130a-130c as shown in FIG. 1) in the electrical distribution network, based, at least in part, on the predefined conditions. For example, the one or more power supply parameters may include at least one of voltage, current, phase, frequency, and power flow associated with the one or more inverters.

For example, the one or more desired applications may correspond to connecting the two connection points including two standalone single-phase electric power systems. In this scenario, the processing module 404 may calculate the set points by a string controller of the DER as a function of its state of charge, the values received by the local area supervisory controller 400 from the automated controller 200.

Figure 5A:
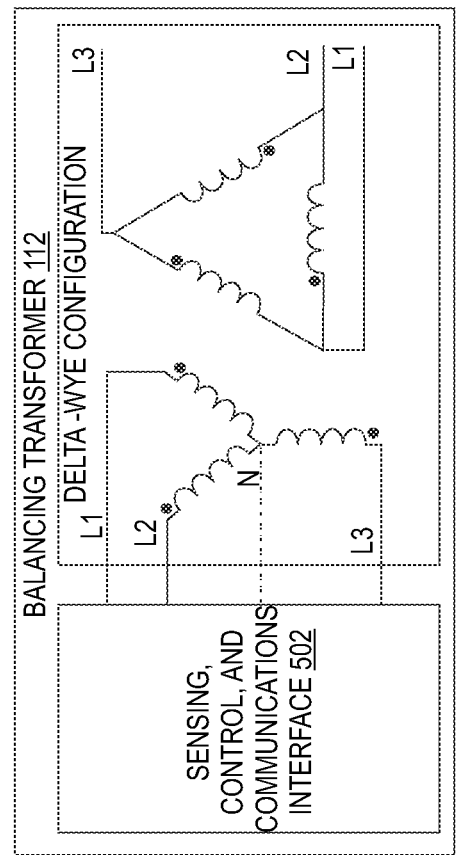
FIG. 5A is a block diagram of a balancing transformer and an electrical network of DERs, in accordance with an embodiment of the invention.
Figure 5A:
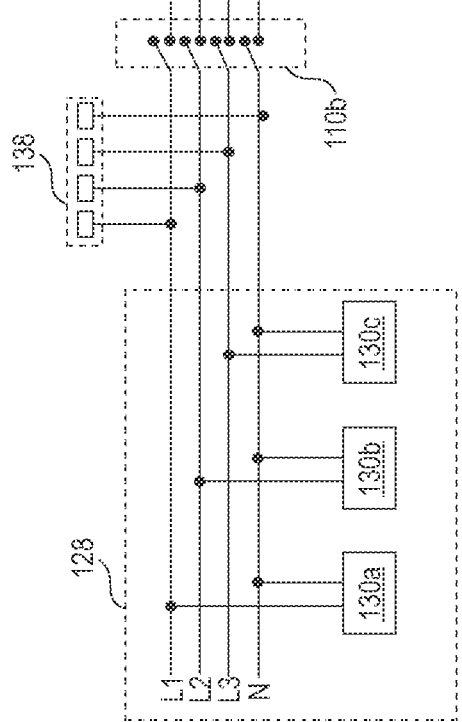
Figure 5B:
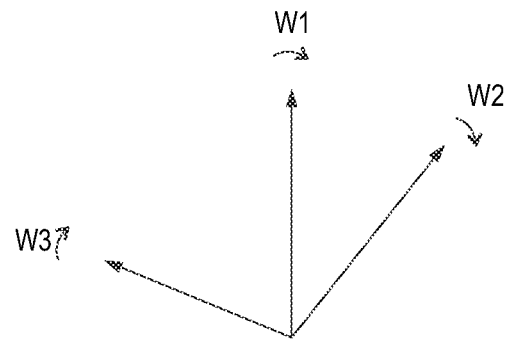
FIG. 5B depicts a phasor diagram of an imbalanced three-phase system, in accordance with an embodiment of the invention.

In another example, the one or more desired applications may correspond to connecting the two connection points including the electrical network 128 having the one or more DERs 130a-130c being connected between a line and a neutral on the three-phase feeder and the balancing transformer 112 as shown in FIG. 5A. In this scenario, the processing module 404 may calculate the set points by implementing a control logic by considering an initial condition. The initial condition may be the electrical network 128 behaving as the three independent single-phase networks which do not respect the angular spacing that the balanced three-phase system would have (120 degrees). When plotted on a phase-magnitude diagram, each phasor will appear to be spinning about the origin at different angular speeds (W1, W2, W3), and the angles between them will vary over time as shown in FIG. 5B. Thus, in this scenario, the frequencies and voltage amplitudes are different.

The electrical network 128 needs to be connected to the balancing transformer 112 to enable the three independent single-phase networks in the electrical network 128 to establish the angular spacing of the balanced three-phase system (120 degrees). The contactors 110b are made available between the electrical network 128 and the balancing transformer 112 so that the electrical network 128 is connected to the balancing transformer 112 upon meeting the connection conditions.

For example, the balancing transformer 112 may be a transformer whose windings are connected in a delta-wye configuration as shown in FIG. 5A. Further, the automated controller 200 may be included in a sensing, control, and communications interface 502 (as shown in FIG. 5A) positioned between the electrical network 128 and the balancing transformer 112. The automated controller 200 may be configured to protect the balancing transformer 112 and the one or more DERs 130a-130c in the electrical network 128. The automated controller 200 is further configured to communicate states of the balancing transformer 112 to the local area supervisory controller 400 via the communication module 406, for the local area supervisory controller 400 to determine the connection conditions and calculate the set points for the one or more inverters of the DERs 130a-130c for meeting the connection conditions before and after closing the contactors 110b. Thus, the balancing transformer 112 provides a stable attractor for the voltage phasors to converge around a balanced configuration, however, the balanced configuration thus obtained may not be a guaranteed configuration. Further, if the connection between the balancing transformer 112 and the electrical network 128 is established before the voltage phasors converge around the balanced configuration, the voltage phasors exhibit arbitrary measurements which can result in high-current conditions that can either damage the balancing transformer 112 or make the one or more DERs 130a-130c in the electrical network 128 to collapse. Thus, the automated controller 200 waits for the connection conditions to be met before closing the contactors 110b.

Further, the processing module 404 calculates the set points using the control logic. In an example, the steps executed by control logic may be described as follows:

Phase 1 is taken as a reference phase. The local area supervisory controller 400 calculates changes to the set points at the one or more inverters of the one or more DERs 130a-130c in order to bring the values measured by the automated controller 200 to the nominal ones. If the automated controller 200 is not co-located with the balancing transformer 112, an estimator based on power flow simulations may be used.

The target voltage of phases 2 and 3 are also set to the nominal value.

The target frequencies of phases 2 and 3 are initially set to values that are slightly above and slightly below the nominal, respectively. This causes a relative drift with respect to the voltage phasor of phase 1.

Figure 5C:
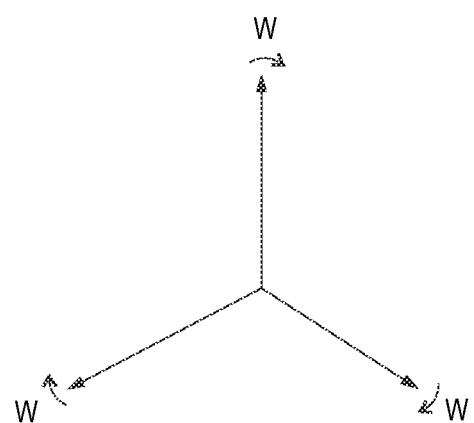
FIG. 5C depicts a phasor diagram of a balanced three-phase system, in accordance with an embodiment of the invention.

Subsequently, the target frequencies of phases 2 and 3 are calculated in proportion to the deviation of their phase angles to a reference value, which is 120 degrees for phase 2 and 240 degrees for phase 3 shown in the below expressions:

$$F_{ref}^2 = F_{ref}^1 + \alpha \cdot (\Theta_2 + 120) \tag{3}$$

$$F_{ref}^3 = F_{ref}^1 + \alpha \cdot (\Theta_3 + 240) \tag{4}$$

Where a is a proportional gain, and where the reference frequencies are limited to be within a small difference δ to the nominal one. The values α and δ are set depending on the speed of communications and the tolerance to transient conditions by the balancing transformer 112 and the DERs 130a-130c. After the voltage phasors (phases 1, 2, and 3) are within the tolerance from the connection conditions, the contactors 110b that connect the wye winding of the balancing transformer 112 to the electrical network 128 is closed by the automated controller 200. Subsequently, the combined action of droop control in the DERs 130a-130c and secondary delta winding in the balancing transformer 112, results in a stable operation point that is close to a balanced three-phase system; this implies that now there's a single frequency for all the network. Moreover, it should be noted that, the delta winding of the balancing transformer 112 is not connected to any external circuitry and is only there to provide the balancing action. Further, when plotted on a phase-magnitude diagram, each phasor will appear to be spinning about the origin at the same angular speed (W), and the angles between them will remain the same (120 degrees) as shown in FIG. 5C.

Depending on a balance of generation and load on each phase, there will be some exchange of active and reactive power between phases through the balancing transformer 112, with two important consequences:
1. The phase angle differences between phases, as well as the voltage amplitudes, will deviate from an ideal balanced three-phase system. This is relevant because it negatively impacts the performance of the three-phase loads such as the three-phase motors connected to this network, and also because high voltages can cause transformer core saturation and adversely affect several types of loads.
2. Some amount of current will circulate through the windings of the balancing transformer 112, which has to be kept below a safe limit to prevent thermal failures.

Thus, the balancing transformer 112 may have to be continuously "relieved" of its balancing burden by equating generation and supply on each phase. Instead of controlling for phase angle and voltage, when the balancing transformer 112 is connected, the local area supervisory controller 400 may aim to zero-out the current into the balancing transformer 112 using an expression of the form:

$$\begin{bmatrix} I_a \text{OFF} \\ I_r \text{SET} \end{bmatrix} = \begin{bmatrix} I_a \text{OFF} \\ I_r \text{SET} \end{bmatrix} + K \begin{bmatrix} I_a \\ I_r \end{bmatrix}$$ (5)

Where $I_a$, $I_r$ are the active and reactive components of the current going into the balancing transformer 112 from a given phase. In an example, the automated controller 200 may be connected with more than one balancing transformer 112, in which case the measured currents are added.

In complex topologies where this approach is not effective enough, the local area supervisory controller 400 may perform a numerical simulation to determine the best setpoints in order to reduce the current in all the transformers while keeping the voltages in the network within the nominal range. This numerical simulation may be implemented in multiple ways, however, the numerical simulation may include three elements:
i. Mathematical models of devices in the system under study: A model may be generated for each component in the system proposed in the present disclosure, and the mathematical models for distribution network components, transformers, and loads are widely used in the electric power sector. The mathematical models also cover system perturbations such as faults.
ii. Power flow solver: This uses numerical methods such as Newton-Raphson in order to solve the system of nonlinear equations that results from the interconnection of all the components.
iii. Optimization algorithm: This algorithm finds the values for the variables of the system that can be manipulated in order to accomplish certain objectives.

For example, a control objective can be to minimize system losses subject to:

1. Keep phase angle deviations smaller than a certain limit.
2. Respect the capacity of the cables in the network, and
3. Respect the maximum and minimum allowed voltage for every customer.

Further, the decision variables are the injections from each DER in the network and the connection state of multiple balancing transformers and contactors. The optimization algorithm selects an initial possible set of values for the decision variables and evaluates the objective and constraints by running the numerical simulation. Based on the outcome of the numerical simulation, the optimization algorithm chooses a different set of values for the decision-variables and simulates it again. It keeps doing the same process until it can't find a better solution that satisfies the constraints. After the best solution has been found, the local area supervisory controller sends the respective commands to the devices in the network.

Figure 6:
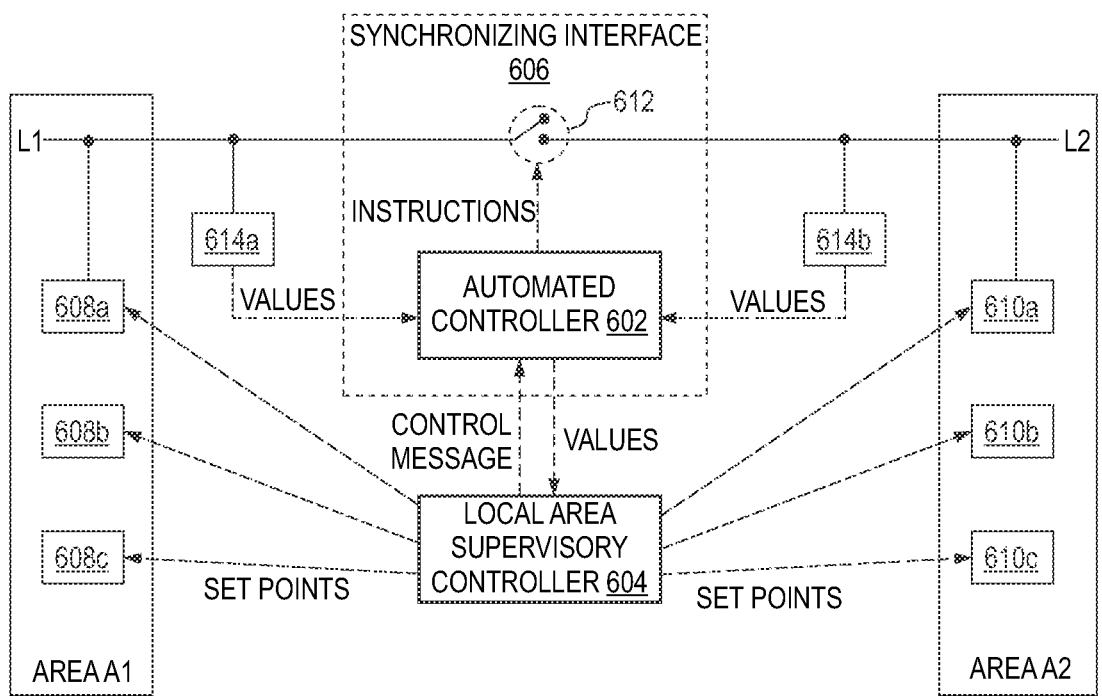
FIG. 6 is a block diagram representation of a distributed electrical system, in accordance with an embodiment of the invention.

FIG. 6 is a block diagram representation of a distributed electrical system 600, in accordance with an embodiment of the invention. For example, the distributed electrical system 600 may be a system including an automated controller 602 and a local area supervisory controller 604. The automated controller 602 and the local area supervisory controller 604 are the same as the automated controller 200 and the local area supervisory controller 400. In one embodiment, the distributed electrical system 600 may include the automated controller 602 and the local area supervisory controller 604 operatively coupled with each other. The local area supervisory controller 604 communicates with the automated controller 602 over a wireless or wired interface. Further, the local area supervisory controller 604 and the automated controller 602 are placed in arbitrary locations of the electrical distribution network. Also, the automated controller 602 can be included in a synchronizing interface 606, and hence it is shown as a part of the synchronizing interface 606 in FIG. 6.

In one embodiment, the local area supervisory controller 604 and the automated controller 602 operate together for controlling an operation of one or more electrical components of the distributed electrical system 600. The one or more electrical components include DERs 608a, 608b, and 608c energizing AC circuits in area A1, with a Line L1 of an AC circuit in the area A1 being energized by the DER 608a. Similarly, considering an area A2 having the one or more electrical components including DERs 610a, 610b, and 610c energizing AC circuits in an area A2, assume that a Line L2 of an AC circuit in the area A2 is energized by the DER 610a. The one or more electrical components may further include contactor 612 (shown in FIG. 6 as a part of the synchronizing interface 606) and electrical sensors 614a and 614b.

The automated controller 602, the local area supervisory controller 604, the DERs 608a-608c and 610a-610c, the contactors 612, and the electrical sensors 614a and 614b are similar to the at least one automated controller 106, the at least one local area supervisory controller 108, the DERs 114a and 114b, the one or more contactors 110a, and the one or more electrical sensors 122a and122b as described in FIG. 1.

In scenarios where the lines L1 and L2 in the areas A1 and A2 are already connected or need to be connected, monitoring the one or more electrical parameters at connection points in the AC circuits in each area may be advantages as it protects the electrical distribution network upon detection of faults, prevents circuit failures due to flow of transient signals, assists in maintaining stability in the network, and the like.

Further, in a scenario where the contactor 612 is open and prior to closing the contactor 612, the one or more electrical parameters on either side of the contactor 612 need to be monitored. Thus, initially, the automated controller 602 receives the values corresponding to the one or more electrical parameters associated with two connection points, each on the lines L1 and L2 in the electrical distribution network, the values being acquired via the electrical sensors 614a and 614b located at the two connection points. The one or more electrical parameters may be voltage magnitude, current, and frequency. The automated controller 602 transmits the values to the local area supervisory controller 604, whenever the local area supervisory controller 604 requests the values. Further, the automated controller 602 receives a control message from the local area supervisory controller 604. The control message including the predefined conditions and the information indicating the automated controller 602 to wait for the predefined conditions to be met between the two connection points. The two connection points are connected to the DERs 608a and 610a in areas A1 and A2 respectively. Further, the automated controller 602 waits for the predefined conditions to meet, and then closes the contactors 612, thereby safely connecting the lines L1 and L2 with each other.

During the process, upon receiving the values from the automated controller 602, the local area supervisory controller 604 determines the predefined conditions to be met between the two connection points, based, at least in part, on the values and the one or more desired applications. In this scenario, the one or more desired applications include connecting two AC circuits (single phase) in the two areas A1 and A2. Thus, the predefined conditions correspond to the synchronization conditions including frequencies, and voltage magnitudes between the two connection points to be the same and voltage phase angle difference between the two connection points to be small with a connection point at a higher frequency leading. Further, the local area supervisory controller 604 calculates the set points associated with the one or more power supply parameters to be regulated at one or more inverters of the DERs 608a-608c, and 610a-610c in the electrical distribution network, based, at least in part, on the synchronization conditions. The one or more power supply parameters include voltage magnitude, current, and frequency associated with the one or more inverters. Furthermore, the local area supervisory controller 604 transmits the set points to the one or more inverters, for regulating the one or more power supply parameters associated with the one or more inverters, to meet the synchronization conditions between the two connection points. The local area supervisory controller 604 also transmits the control message to the automated controller 602. The control message including the synchronization conditions and the information indicating the automated controller 602 to wait for the synchronization conditions to be met, prior to closing the operation of the contactors 612.

Upon closing the contactors 612, a goal of the system is to control power flow through the synchronizing interface 606. To achieve this, the local area supervisory controller 604 requests for information about the power flow from the automated controller 602, and adjusts the operation of the DERs 608a-608c and 610a-610c in the electrical distribution network to reduce error by determining the synchronization conditions and calculating the setpoints corresponding to the power flow that needs to be maintained for the proper functioning of the electrical distribution network.

Figure 7:
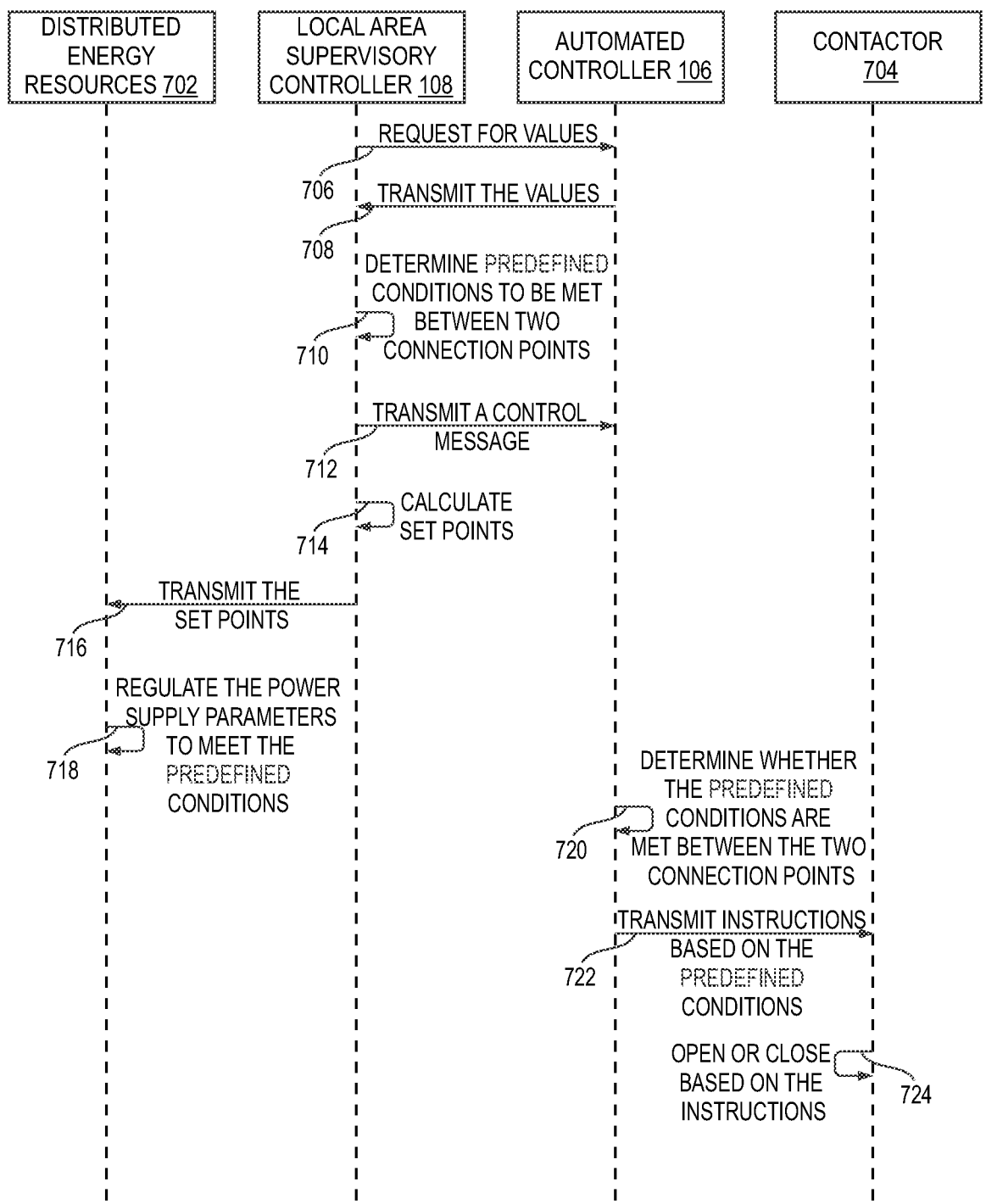
FIG. 7 is a sequence flow diagram depicting a process flow for managing a distributed electrical system in real-time, in accordance with an embodiment of the invention.

FIG. 7 is a sequence flow diagram 700 depicting a process flow for managing a distributed electrical system in real-time, in accordance with an embodiment of the invention. The Distributed Energy Resources (DERs) 702 is similar to the DERs 114a, 114b, 130a, 130b, or 130c of FIG. 1, and the contactors 704 is similar to the contactors 110a, 110b, or 110c of FIG. 1. Further, the local area supervisory controller 108, and the automated controller 106 are described with reference to FIG. 1. The sequence flow diagram starts from 706.

At 706, the local area supervisory controller 108 requests for values corresponding to one or more electrical parameters at a plurality of connection points in an electrical distribution network. The local area supervisory controller 108 requests the values from the automated controller 106, as the automated controller 106 is capable of acquiring the values through the one or more electrical sensors (e.g., 122a, 122b, 124, and 126). In an embodiment, the one or more electrical parameters may include at least one of voltage, current, phase, frequency, and power flow. In scenarios such as an interconnection between two connection points of the plurality of connections needs to be established, an interconnection between the two connection points is already established, and a transition between a single-phase electricity supply and a three-phase electricity supply may be needed, monitoring and controlling the one or more electrical parameters may be needed. Thus, the automated controller 106 and the local area supervisory controller 108 may communicate with each other for monitoring and controlling the one or more electrical parameters for the management of the power distribution in the electrical distribution network.

At 708, the automated controller 106 transmits the values to the local area supervisory controller 108, upon receiving the values through the one or more electrical sensors.

At 710, the local area supervisory controller 108 determines the predefined conditions to be met between the two connection points. The local area supervisory controller 108 determines the predefined conditions to be met, based, at least in part, on the values and one or more desired applications. In one scenario, the predefined conditions may correspond to the synchronization conditions including frequencies, voltage magnitudes between the two connection points to be the same, and voltage phase angle difference between the two connection points to be small (less than a predefined threshold) with a connection point at a higher frequency leading, when the one or more desired applications correspond to connecting the two connection points including two standalone single-phase electric power systems. The synchronization conditions may further include each of the two connection points to have the same sequence for three-phases, when the one or more desired applications may correspond to connecting the two connection points including two three-phase electric power systems.

In another scenario, the predefined conditions may correspond to the connection conditions including at least one of frequency of three-phases being approximately the same, voltage amplitude of each of the three-phases being within an absolute and a relative range, and a voltage phase angle difference from a perfectly balanced configuration being small (less than a predefined threshold), when the one or more desired applications may include connecting the two connection points including an electrical network (e.g., the electrical network 128 as shown in FIG. 1) having one or more DERs (e.g., DERs 130a-130c) being connected between a line and a neutral on a three-phase feeder and a three-phase balancing transformer (e.g., the at least balancing transformer 112 as shown in FIG. 1).

At 712, the local area supervisory controller 108 transmits a control message to the automated controller 106. The control message includes the predefined conditions and information indicating the automated controller106 to wait for the predefined conditions to be met between the two connection points.

At 714, the local area supervisory controller 108 calculates set points associated with one or more power supply parameters to be regulated at one or more inverters of the DER 702 (e.g., DERs 114*a*, 114*b*, and 130*a*-130*c* as shown in FIG. 1) in the electrical distribution network. The local area supervisory controller 108 calculates the set points, based, at least in part, on the predefined conditions. For example, the one or more power supply parameters may include at least one of voltage, current, phase, frequency, and power flow associated with the one or more inverters. The setpoints are operational values at which the DER 702 is supposed to operate to meet the predefined conditions between the two connection points.

At 716, the local area supervisory controller 108 transmits the setpoints to the DERs 702. The local area supervisory controller 108 transmits the setpoints to one or more inverters of the DERs 702, for regulating the one or more power supply parameters associated with the one or more inverters, to meet the predefined conditions between the two connection points.

At 718, the DERs 702 regulate the one or more power supply parameters to meet the predefined conditions between the two connection points. At 720, the automated controller 106 determines whether the predefined conditions are met between the two connection points.

At 722, the automated controller 106 transmits instructions to the contactors 704 (e.g., 110*a*, 110*b*, and 110*c* of FIG. 1), based on the predefined conditions. The instructions may include instructions for the contactors 704 to either close or open. If the contactors 704 are open, and if the predefined conditions are met between the two connection points, then the automated controller 106 may instruct the contactors 704 to close. Upon closing the contactors 704, the power flow through the interconnection may be observed. If the power flow exceeds a tolerance limit, then the automated controller 106 instructs the contactors 704 to open, else the contactors 704 remain closed. At 724, the contactors 704 open or close based on the instructions.

Figure 8:
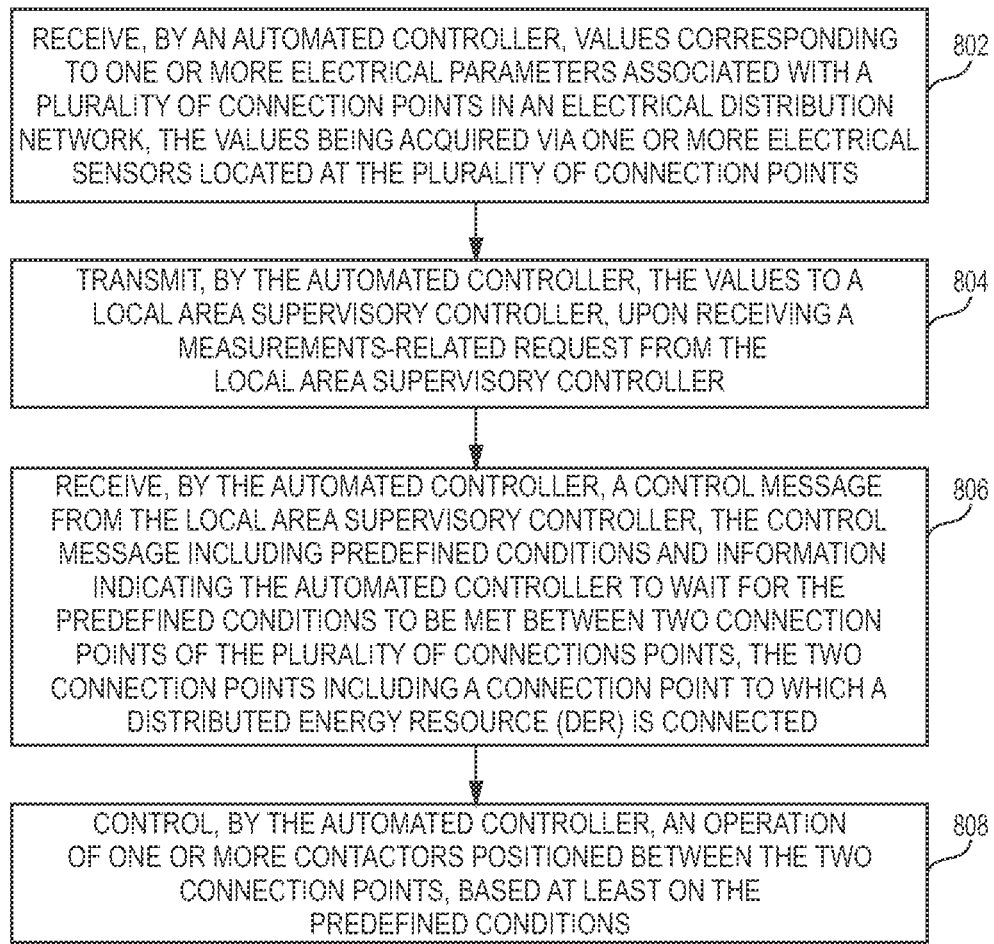
FIG. 8 is a flow chart depicting a method performed by an automated controller, in accordance with an embodiment of the invention.

FIG. 8 is a flow chart depicting a method 800 performed by an automated controller, in accordance with an embodiment of the invention. The method 800 depicted in the flow chart may be executed by the automated controller (e.g., the automated controller 106). Operations of the method 800 and combinations of operations in the flow chart, may be implemented by, for example, hardware, firmware, a processor, circuitry, and/or a different device associated with the execution of software that includes one or more computed program instructions. The method 800 starts at operation 802.

At 802, the method 800 includes receiving, by the automated controller, values corresponding to one or more electrical parameters associated with a plurality of connection points in an electrical distribution network, the values being acquired via one or more electrical sensors located at the plurality of connection points.

At 804, the method 800 includes transmitting, by the automated controller, the values to a local area supervisory controller, upon receiving a measurements-related request from the local area supervisory controller.

At 806, the method 800 further includes receiving, by the automated controller, a control message from the local area supervisory controller, the control message including predefined conditions and information indicating the automated controller to wait for the predefined conditions to be met between two connection points of the plurality of connections points, the two connection points including a connection point to which a distributed energy resource (DER) is connected.

At 808, the method 800 further includes controlling, by the automated controller, an operation of one or more contactors positioned between the two connection points, based at least on the predefined conditions.

Figure 9:
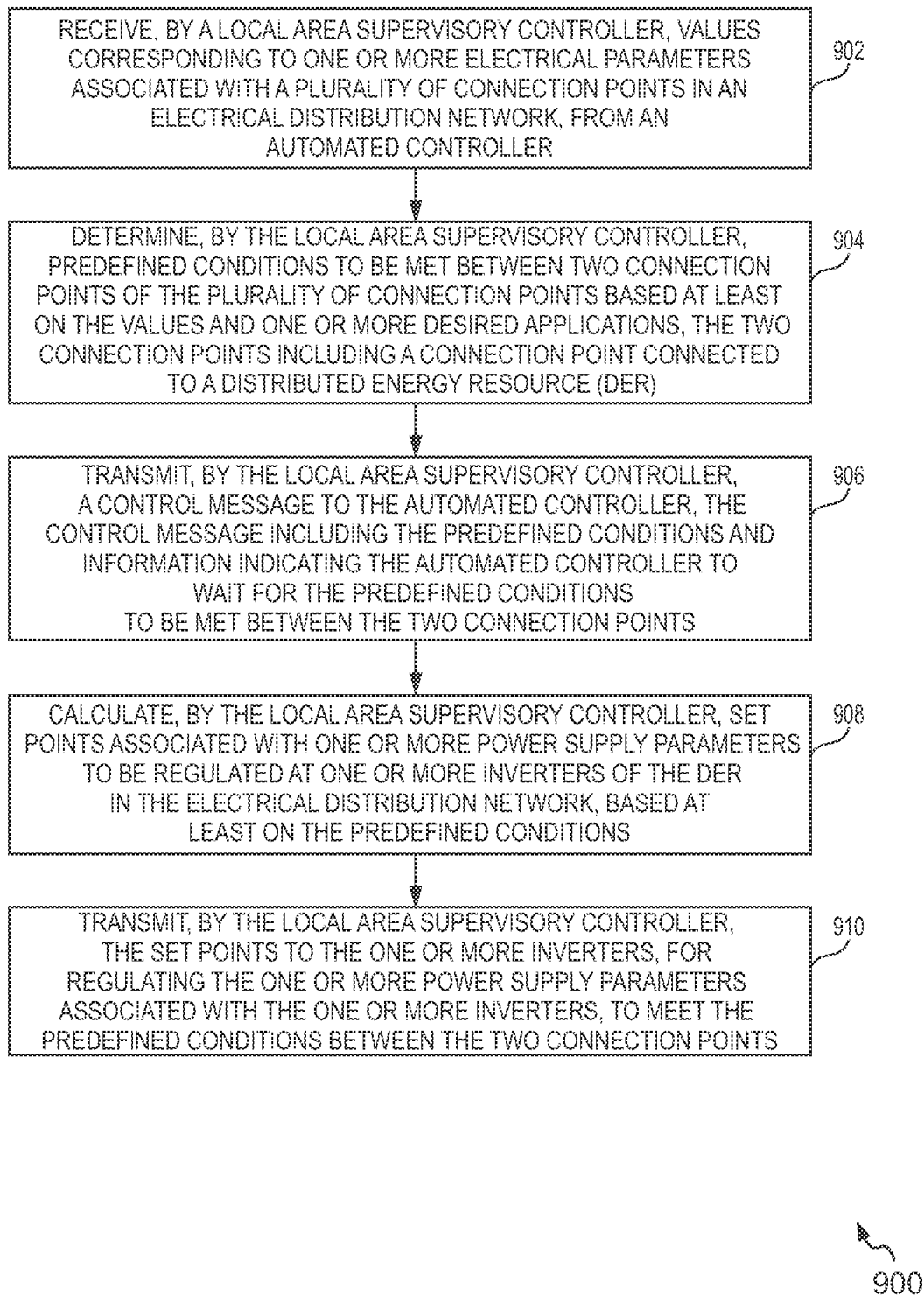
FIG. 9 is a flow chart depicting a method performed by a local area supervisory controller, in accordance with an embodiment of the invention.

FIG. 9 is a flow chart depicting a method 900 performed by a local area supervisory controller, in accordance with an embodiment of the invention. The method 900 depicted in the flow chart may be executed by the local area supervisory controller (e.g., the local area supervisory controller 108). Operations of the method 900 and combinations of operations in the flow chart, may be implemented by, for example, hardware, firmware, a processor, circuitry and/or a different device associated with the execution of software that includes one or more computed program instructions. The method 900 starts at operation 902.

At 902, the method 900 includes receiving, by a local area supervisory controller, values corresponding to one or more electrical parameters associated with a plurality of connection points in an electrical distribution network, from an automated controller.

At 904, the method 900 further includes determining, by the local area supervisory controller, predefined conditions to be met between two connection points of the plurality of connection points, based, at least in part, on the values and one or more desired applications, the two connection points including a connection point connected to a Distributed Energy Resource (DER).

At 906, transmitting, by the local area supervisory controller, a control message to the automated controller, the control message including the predefined conditions and information indicating the automated controller to wait for the predefined conditions to be met between the two connection points.

At 908, the method 900 includes calculating, by the local area supervisory controller, set points associated with one or more power supply parameters to be regulated at one or more inverters of the DER in the electrical distribution network, based at least on the predefined conditions.

At 910, the method 900 includes transmitting, by the local area supervisory controller, the set points to the one or more inverters, for regulating the one or more power supply parameters associated with the one or more inverters, to meet the predefined conditions between the two connection points.

The disclosed methods with reference to FIGS. 7-9, or one or more operations of the sequence flow diagram 700 and the flow charts 800 and 900 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during the implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the present disclosure facilitate synchronizing of two active sections of an electrical distribution network, or a single section to a distributed energy resource (DER), and automatically disconnect two AC circuits when a fault is detected. The embodiments also facilitate direct controlling of the inverters in the DERs in order to improve the quality of the three-phase electricity supply to the electrical distribution network. The embodiments herein also facilitate acquiring values corresponding to electrical parameters in distant locations with a high-precision time reference frame. Further, the embodiments also facilitate the automated controller to serve as an interface for a power transformer.

Moreover, as the embodiments facilitate distributed monitoring of the electrical parameters, it can help in identifying energy theft. Further, as the embodiments describe an ability to create a controllable three-phase system, it facilitates the integration of the controllable three-phase system with a public grid. The embodiments also describe a distributed nature of the DERs, and hence avoid a single point of failure, as present in centralized solutions. Furthermore, in a scenario, when first providing power to a community, developers lack information about how much power the users would need in the future, and whether they'll need a three-phase supply. Starting with a single-phase solution is cheaper, and the embodiments enable the developers to easily convert to three-phase in the future if it becomes necessary.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method comprising:
receiving, by an automated controller, values corresponding to one or more electrical parameters associated with a plurality of connection points in an electrical distribution network, the values being acquired via one or more electrical sensors located at the plurality of connection points, wherein receiving the values corresponding to the one or more electrical parameters comprises receiving the values corresponding to at least one of voltage, current, phase, frequency, and power flow;
transmitting, by the automated controller, the values to a local area supervisory controller, upon receiving a measurements-related request from the local area supervisory controller;
receiving, by the automated controller, a control message from the local area supervisory controller, the control message comprising predefined conditions and information indicating the automated controller to wait for the predefined conditions to be met between two connection points of the plurality of connections points, the two connection points comprising a connection point to which a distributed energy resource (DER) is connected; and
controlling, by the automated controller, an operation of one or more contactors positioned between the two connection points, based at least on the predefined conditions.

2. The method as claimed in claim 1, further comprising, logging, by the automated controller, received data with time stamps determined based on a location of the automated controller, the received data corresponding to the values received by the automated controller.

3. The method as claimed in claim 1, wherein controlling the operation of the one or more contactors comprises enabling closure of the one or more contactors in response to one of an external command requesting to close the one or more contactors is received and the predefined conditions are met between the two connection points.

4. The method as claimed in claim 3, wherein enabling the closure of the one or more contactors comprises setting up a connection between the two connection points in the electrical distribution network via an interface, the interface comprising the automated controller.

5. The method as claimed in claim 1, wherein controlling the operation of the one or more contactors comprises enabling an opening of the one or more contactors in response to one of: an attempt to meet the predefined conditions between the two connection points is failed, a reboot command is received, a time in a connecting state exceeds a timeout parameter, a fault is detected in the electrical distribution network, an operator needs to perform maintenance and inspection operations, and safety regulations are not met.

6. A method comprising:
receiving, by a local area supervisory controller, values corresponding to one or more electrical parameters associated with a plurality of connection points in an electrical distribution network, from an automated controller, wherein receiving the values corresponding to the one or more electrical parameters comprises receiving the values corresponding to at least one of voltage, current, phase, frequency, and power flow;
determining, by the local area supervisory controller, predefined conditions to be met between two connection points of the plurality of connection points based at least on the values and one or more desired applications, the two connection points comprising a connection point connected to a Distributed Energy Resource (DER);

transmitting, by the local area supervisory controller, a control message to the automated controller, the control message comprising the predefined conditions and information indicating the automated controller to wait for the predefined conditions to be met between the two connection points;

calculating, by the local area supervisory controller, set points associated with one or more power supply parameters to be regulated at one or more inverters of the DER in the electrical distribution network, based at least on the predefined conditions; and transmitting, by the local area supervisory controller, the set points to the one or more inverters, for regulating the one or more power supply parameters associated with the one or more inverters, to meet the predefined conditions between the two connection points.

7. The method as claimed in claim 6, wherein the predefined conditions correspond to synchronization conditions comprising frequencies, voltage magnitudes between the two connection points to be same, and voltage phase angle difference between the two connection points to be less than a predefined threshold with a connection point at a higher frequency leading, wherein the one or more desired applications correspond to connecting the two connection points comprising two standalone single phase electric power systems.

8. The method as claimed in claim 7, wherein the synchronization conditions further comprise each of the two connection points to have the same sequence for three phases, wherein the one or more desired applications correspond to connecting the two connection points including two three-phase electric power systems.

9. The method as claimed in claim 6, wherein the predefined conditions correspond to connection conditions comprising at least one of frequency of three phases being same, voltage amplitude of each of the three phases being within an absolute and a relative range, and a voltage phase angle difference from a perfectly balanced configuration being less than a predefined threshold, when wherein the one or more desired applications comprises connecting the two connection points comprising an electrical network having one or more DERs being connected between a line and a neutral on a three-phase feeder and a three-phase balancing transformer.

10. The method as claimed in claim 6, wherein calculating the set points comprises calculating the set points by implementing a control logic by considering an initial condition, wherein the one or more desired applications comprise connecting the two connection points comprising an electrical network having one or more DERs being connected between a line and a neutral on a three-phase feeder and a three-phase balancing transformer.

11. The method as claimed in claim 6, wherein calculating the set points associated with the one or more power supply parameters comprises calculating the set points associated with at least one of voltage, current, phase, frequency, and power flow associated with the one or more inverters.

12. An automated controller, comprising:
a memory configured to store instructions; a communication interface; and
a processor in communication with the memory and the communication interface, the processor configured to execute the instructions stored in the memory and thereby cause the automated controller to perform at least in part to:
receive values corresponding to one or more electrical parameters associated with a plurality of connection points in an electrical distribution network, the values being acquired via one or more electrical sensors located at the plurality of connection points, wherein the one or more electrical parameters comprises at least one of voltage, current, phase, frequency, and power flow;

transmit the values to a local area supervisory controller, upon receiving a measurements-related request from the local area supervisory controller;

receive a control message from the local area supervisory controller, the control message comprising predefined conditions and information indicating the automated controller to wait for the predefined conditions to be met between two connection points of the plurality of connections points, the two connection points comprising a connection point to which a distributed energy resource (DER) is connected; and control an operation of one or more contactors positioned between the two connection points, based at least on the predefined conditions.

13. A distributed electrical system comprising:
at least one automated controller and at least one local area supervisory controller, the at least one local area supervisory controller operatively coupled with the at least one automated controller, the at least one automated controller configured to:
receive values corresponding to one or more electrical parameters associated with a plurality of connection points in an electrical distribution network, the values being acquired via one or more electrical sensors located at the plurality of connection points, wherein the one or more electrical parameters comprises at least one of voltage, current, phase, frequency, and power flow;

transmit the values to the at least one local area supervisory controller, upon receiving a measurements-related request from the at least one local area supervisory controller;

receive a control message from the at least one local area supervisory controller, the control message comprising predefined conditions and information indicating the at least one automated controller to wait for the predefined conditions to be met between two connection points of the plurality of connections points, the two connection points comprising a connection point to which a distributed energy resource (DER) is connected; and control an operation of one or more contactors positioned between the two connection points, based at least on the predefined conditions, the at least one local area supervisory controller configured to:
receive the values corresponding to the one or more electrical parameters associated with the plurality of connection points in the electrical distribution network, from the at least one automated controller;

determine the predefined conditions to be met between the two connection points based at least on the values and one or more desired applications;

transmit the control message to the at least one automated controller, the control message comprising the predefined conditions and the information indicating the at least one automated controller to wait for the predefined conditions to be met between the two connection points, prior to controlling the operation of the one or more contactors;

calculate set points associated with one or more power supply parameters to be regulated at one or more inverters of the DER in the electrical distribution network, based at least on the predefined conditions; and transmit the set points to the one or more inverters, for regulating the one or more power supply parameters associated with the one or more inverters, to meet the predefined conditions between the two connection points.

14. The distributed electrical system as claimed in claim 13, wherein the one or more power supply parameters comprise at least one of voltage, current, phase, frequency, and power flow associated with the one or more inverters.

15. The distributed electrical system as claimed in claim 13, wherein the electrical distribution network comprises at least one of interconnection of at least two microgrids, the interconnection of the at least two three-phase systems, and an interconnection of an electrical network comprising one or more DERs being connected between a line and a neutral on a three-phase feeder and a three-phase balancing transformer.

16. The distributed electrical system as claimed in claim 15, wherein the electrical distribution network comprises the one or more contactors, wherein the one or more contactors further provide the interconnection of at least two microgrids, the interconnection of the at least two three-phase systems, and the interconnection of an electrical network comprising one or more DERs connected between a line and a neutral on a three-phase feeder and a three-phase balancing transformer.

17. The distributed electrical system as claimed in claim 16, wherein the interconnection of the electrical network and the three-phase balancing transformer via the one or more contactors enable balancing three phases generated by the one or more DERs in the electrical network, thereby generating a three-phase power that follows a phenomenon of maintaining 120 degrees phase separation between the three phases.

18. The distributed electrical system as claimed in claim 13, wherein the at least one automated controller comprises the one or more contactors.

19. A local area supervisory controller, comprising:
a memory configured to store instructions;
a communication interface; and
a processor in communication with the memory and the communication interface, the processor configured to execute the instructions stored in the memory and thereby cause the automated controller to perform at least in part to:
receive values corresponding to one or more electrical parameters associated with a plurality of connection points in an electrical distribution network, from an automated controller, wherein the one or more electrical parameters comprises at least one of voltage, current, phase, frequency, and power flow;
determine predefined conditions to be met between two connection points of the plurality of connection points, based, at least in part, on the values and one or more desired applications, the two connection points comprising a connection point connected to a Distributed Energy Resource (DER);
transmit a control message to the automated controller, the control message comprising the predefined conditions and information indicating the automated controller to wait for the predefined conditions to be met between the two connection points;
calculate set points associated with one or more power supply parameters to be regulated at one or more inverters of the DER in the electrical distribution network, based at least on the predefined conditions; and
transmit the set points to the one or more inverters, for regulating the one or more power supply parameters associated with the one or more inverters, to meet the predefined conditions between the two connection points.

* * * * *